Figure 1:
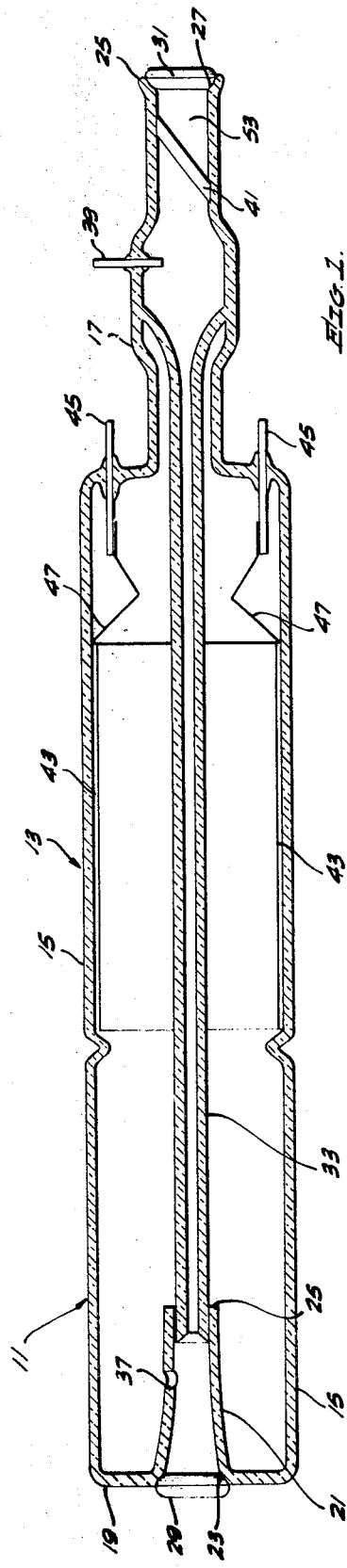

United States Patent

[11] 3,609,587

[72] Inventors William P. Kolb, Jr.
 Manhattan Beach;
 Dale E. Crane, Torrance, both of Calif.
[21] Appl. No. 869,632
[22] Filed Oct. 27, 1969
[45] Patented Sept. 28, 1971
[73] Assignee Hughes Aircraft Company
 Culver City, Calif.

[54] GAS LASER WITH ADJUSTABLE MIRROR
 1 Claim, 2 Drawing Figs.
[52] U.S. Cl. .................................... 331/94.5,
 313/217
[51] Int. Cl. ..................................... H01s 3/02
[50] Field of Search ........................... 331/94.5;
 313/217

[56] References Cited
UNITED STATES PATENTS

| | | | |
|---|---|---|---|
| 3,187,270 | 6/1965 | Kogelnik | 331/94.5 |
| 3,396,343 | 8/1968 | Wesselink | 331/94.5 |
| 3,435,363 | 3/1969 | Patel | 331/94.5 |
| 3,492,599 | 1/1970 | Rigrod | 331/94.5 |

OTHER REFERENCES

Moore, " Gas Laser Frequency Selection by Molecular Absorption," Applied Optics, 4, (2) Feb. 1965 pp. 252- 253

Large-Hill, " A Compact Pulsed Gas Laser for the For Infrared," Applied optics, 4, (5), May 1965, pp. 625- 626

Zatseu, " Ball-Joint for the Adjustment and Fixing of Mirrors and Windows of a Gas Laser," Instrum. & Exper. Tech. May-June 1966, pp. 736- 737.

*Primary Examiner*—Ronald L. Wibert
*Assistant Examiner*—R. J. Webster
*Attorneys*—Paul M. Cable and W. H. MacAllister, Jr.

ABSTRACT: A gas laser having an elongated plasma tube with a fixed mirror at one end and an adjustable mirror at the other end. An isolation element such as a Brewster window is disposed in the plasma tube near the adjustable mirror to create a gastight discharge compartment between itself and the fixed mirror while maintaining the regenerative path defined by and extending between the mirrors. An active laser gas is disposed in the discharge compartment and appropriate means for exciting the gas to a lasing state is provided whereby alignment of the mirrors may be accomplished while the laser is in operation.

PATENTED SEP28 1971

3,609,587

INVENTORS.
WILLIAM P. KOLB, JR.,
DALE E. CRANE,

*John Hollister Jr.*
ATTORNEY.

GAS LASER WITH ADJUSTABLE MIRROR

Gas lasers can be constructed generally in two different fashions, each having distinct advantages and disadvantages. In the first category of construction is simply a plasma tube bottle in which windows (usually Brewster angle windows) are attached to the vacuum envelope and in which the regenerative cavity mirrors are supported externally of the bottle. The second construction is one in which the laser mirrors are attached directly to the vacuum bottle so that the mirrors complete the vacuum envelope.

In the first example, the alignment of the external mirrors is critical both with respect to each other and with respect to the plasma tube bore. In this case, a cavity structure must be provided to hold the mirrors in place with respect to one another and with respect to the tube. The Brewster windows serve to provide very low loss in one plane of polarization and relatively high loss in the orthogonal plane of polarization. The laser will then oscillate in only the low loss plane of polarization and the output will be plane polarized or linear. This type of construction allows mirror alignment while the laser is in operation and a predicted linear polarization of the output beam is provided but it has a poor cavity stability with respect to temperature and vibration and is especially prone to contamination from dust, humidity, etc.

On the other hand, the directly attached mirror configuration, as previously described, has prealigned mirrors that never need adjustment or cleaning. The cavity structure is the vacuum envelope itself, which in general is fabricated of material that is relatively stable with temperature variations. This internal mirror construction creates no preferred polarization in the laser output and adjacent longitudinal cavity modes may tend to oscillate in orthogonal planes of polarization to result in an operation wherein the output laser beam polarization cannot be predicted and may even change with time. Although the internal mirror-type tube has good built-in stability with respect to temperature and vibration, the mirrors are fixed in place and require alignment prior to laser oscillation which is difficult to accomplish and leads to a high rate of rejection at the quality control station of a production line.

Still another construction technique has been used which overcomes the disadvantage of not being able to predict the output beam polarization but still requires the necessity of prealignment of the mirrors and further introduces yet another disadvantage. This technique essentially amounts to replacement of one of the mirrors with a mirrored half prism arrangement wherein the entrance surface is set at Brewster's angle to provide low loss in one plane of polarization. The incoming wave is then refracted to the mirrored rear prism surface such that the wave will then reflect back on itself, thereby retracing its path and forming a tuned oscillator cavity. This system also serves the purpose of selecting wavelengths since the refractive index of the prism varies with wavelength. Detracting from this above-described advantage is the previously mentioned fact that the mirrors must be prealigned, and the new problem presented is that the device is subject to mirror misalignment caused by temperature variations since the half-prism arrangement is highly sensitive to temperature detuning. In fact, for a long radius mirror cavity, this detuning is sufficient to stop laser oscillation where the temperature changes only a few degrees centigrade, while the problem is not nearly so severe in the near hemispherical cavity due to decreased mirror alignment sensitivity, it can cause unwanted power variations as the temperature varies.

From the foregoing, it should be clear that a device incorporating the best features of each type of construction without introducing new undesirable features or adding significantly to the cost of manufacture would be a significant advancement of the gas laser art.

Accordingly, it is an object of the present invention to provide a gas laser which is not subject to the disadvantages of the prior art and which incorporates an adjustable mirror for ease of mirror alignment while the laser is in operation.

It is another object of the present invention to provide a simple, low cost, stable, and maintenance-free gas laser.

It is still another object of the present invention to provide a gas laser in which maximum power output may be attained and in which linearly polarized output is available.

It is yet another object of the present invention to provide high quality gas lasers at costs comparable to lower quality internal mirror lasers presently on the market.

Still another object of the present invention is to provide a gas laser in which undesired competing modes of oscillation may be discouraged.

These and other objects of the invention are obtained in a gas laser including an elongated plasma tube having first and second ends and regenerative cavity means including a fixed mirror at the first end and an adjustable mirror at the second end for defining a laser regenerative path between the mirrors through the plasma tube. Isolation means is disposed in the plasma tube and spaced from the adjustable mirror for providing a gastight discharge compartment between itself and the first end while maintaining the regenerative path. Also an active laser gas is disposed in the discharge compartment of the laser tube and excitation means is coupled to the active laser gas for exciting the gas to a lasing state.

The isolation means may take the form of a Brewster angle window, or an optically transparent plate may be disposed orthogonally with respect to the regenerative path where this type of internally provided means for polarizing the laser energy is not desired.

Figure 2:
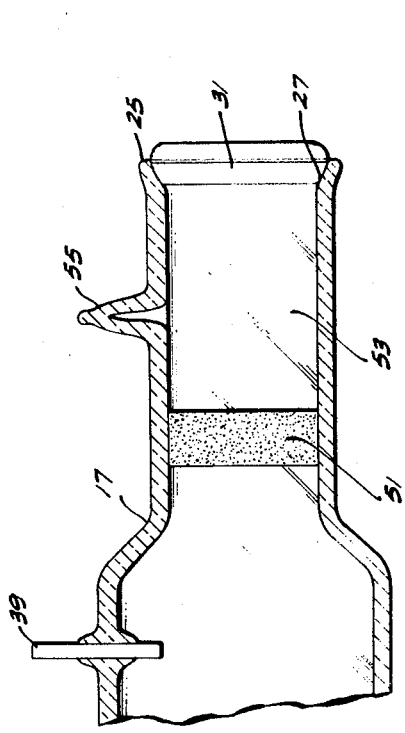

The invention and specific embodiments thereof will be described hereinafter by way of example and with reference to the accompanying drawing wherein like reference numerals refer to like elements or parts and in which:

FIG. 1 is a cross-sectional view of a preferred embodiment of the present invention; and FIG. 2 is a cross-sectional view of a portion of another embodiment of the invention.

Referring now to the drawing and more particularly to the gas laser 11 of FIG. 1, there is shown an elongated plasma tube 13 having a relatively larger diameter main body envelope portion 15 and a relatively smaller diameter anode envelope portion 17. The tube 13 also has a first end 19 whereat a capillary-supporting hollow tubulation 21 and a coaxially disposed output mirror-supporting portion 23, and a second end 25 with an adjustable mirror-supporting portion 27. The mirror-supporting portions are shown having a ball socket surface so that an output, partially transmissive mirror 29 and a highly reflecting adjustable mirror 31 may be moved for alignment purposes; the former being aligned prior to operation, while the latter being aligned while the laser is oscillating.

Within the plasma tube 13 is coaxially positioned an elongated capillary hollow discharge tube 33 held within an inner end 35 of the tubulation 21 and at its other end by the inner wall of the anode envelope portion 17. The plasma tube 13 also holds an active laser gas or mixture such as Ne-Ne, for example. The gas is allowed to circulate within the plasma tube 13, the capillary tube 33 through an aperture 37 in the tubulation 21 and the area adjacent an anode terminal 39 in the anode envelope portion 17. However, the active gas is prevented from propagating to an area adjacent the second end 25 of the plasma tube 13 by a gas containment member 41 which may be any laser energy-transmissive window such as the Brewster angle window shown.

The active laser gas may be excited to a lasing state by any conventional pump means such as a conventional pump source connected to a discharge arrangement including the anode electrode 39 and a cylindrical cathode electrode 43 whose outer surface substantially coincides with the inner surface of the plasma tube 13. The cathode 43 may be fabricated from aluminum or tantalum preferably with a thin oxide layer on its inner surface. The cathode electrode 43 is connected to cathode-conductive pins 45 of tungsten, for example, by means of springlike conductive contactors 47. Although two conductive pins 45 are shown, it is apparent that only one is necessary to provide electrical contact to the cathode 43. In practice, however, two, three, or even more may be desirable for mechanical support. In this regard, reference may be made to a gas discharge tube disclosed in a copending application Ser. No. 703,384 which is assigned to the assignee of this invention.

The novel construction technique described above allows the output mirror 29 to be aligned and permanently attached in place, by an epoxy for example, and the axially aligned light-transmissive window 41 positioned by means of precision mating surfaces of the window and the adjacent inner surface of the anode envelope portion 17, and also epoxied in place. The gastight compartment to the left of the window 41 is then complete and may be processed to provide the oxide coating on the cathode electrode 43, for example. After processing, the highly reflecting adjustable mirror 31 is then aligned with the laser 11 operating to the point of attaining maximum power output and then also permanently attached in place.

With reference to the embodiment illustrated in FIG. 2, the anode portion 17 of the plasma tube 13 is provided with a transversely disposed, nonpolarizing light-transmissive window 51 which serves to prevent the active gas from reaching the area immediately adjacent the adjustable mirror 31. The inner window 41 of FIG. 1 and the inner window 51 of FIG. 2 may also serve to provide a filter compartment 53 which may be filled with a gas or gas mixture adapted to suppress the competition effects previously mentioned in connection with the prior art. For example, in a 6328° A. He-Ne laser, methane gas may be disposed in the filter compartment 53 to suppress a competing $3.39\mu$ infrared line. It has also been found that the material used for the fabrication of the window may itself act as a filter at a desired wavelength. For example, the windows 41 and 51 may be of crown glass or borosilicate glass which will suppress the unwanted $3.39\mu$ line. Further, the window 51 may be partially reflective so that it, in conjunction with the adjustable mirror 31, will act as an etalon to provide single line output.

The compartment 53 may also be provided with a communicating tubulation 55 as seen in FIG. 2. This will allow the evacuating or the pressurization of the compartment 53 at any time during or subsequent to the final alignment of the adjustable mirror 31. Thus, this area may be filled with a desired gas to a desired pressure for filter purposes or for tuning purposes since variations in pressure of the gas within the laser regenerative cavity tends to, in effect, change the length of the regenerative path and the frequency of laser oscillation.

From the foregoing, it should be evident that the invention provide a unique gas laser that exhibits the same stable, maintenance-free cavity qualities as is available in conventional internal mirror lasers and wherein the laser output power can be maximized under ideal conditions, that is, while the laser is operating. Also, the invention provides an advantageous means to produce a linearly polarized output beam, and a simple means to suppress undesired competition effects.

In practicing the invention, any active laser gaseous material may be used and any conventional material such as suitable glass, quartz or ceramics may be utilized in the fabrication of the plasma and discharge tubes.

It is intended that the foregoing disclosure and drawing shall be considered only as illustrations of the principles of this invention and are not to be construed in a limiting sense.

What is claimed is:

1. A gas laser comprising:
   an elongated plasma tube having first and second ends;
   regenerative cavity means including a fixed mirror at said first end and an adjustable mirror at said second end for defining a laser-regenerative path between said mirrors through said plasma tube;
   isolation means disposed in said plasma tube and spaced from said adjustable mirror for providing a gastight discharge compartment between itself and said first end while maintaining said regenerative path, said isolation means being a light-transmissive window perpendicularly positioned with respect to said regenerative path and acting in conjunction with said adjustable means as an etalon tuned to a desired wavelength;
   an active laser gas disposed in said discharge compartment of said plasma tube; and
   means coupled to said active laser gas for exciting said gas to a lasing state.